US012797896B2

(12) United States Patent
Choi et al.

(10) Patent No.: US 12,797,896 B2
(45) Date of Patent: Nov. 17, 2026

(54) ELECTRODE SLURRY TRANSFER SYSTEM AND ELECTRODE SLURRY TEMPERATURE CONTROL METHOD USING SAME

(71) Applicant: LG Energy Solution, Ltd., Seoul (KR)

(72) Inventors: Ho Jun Choi, Daejeon (KR); Byeong Won Lee, Daejeon (KR); Sung Sang Kwon, Daejeon (KR); Gyu Sun Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 324 days.

(21) Appl. No.: 18/832,277

(22) PCT Filed: Oct. 26, 2023

(86) PCT No.: PCT/KR2023/016735
§ 371 (c)(1),
(2) Date: Jul. 23, 2024

(87) PCT Pub. No.: WO2024/091016
PCT Pub. Date: May 2, 2024

(65) Prior Publication Data

US 2025/0100007 A1 Mar. 27, 2025

(30) Foreign Application Priority Data

Oct. 26, 2022 (KR) ........................ 10-2022-0139373

(51) Int. Cl.
*H01M 4/04* (2006.01)
*B01F 35/221* (2022.01)
(Continued)

(52) U.S. Cl.
CPC ...... *B05C 11/1042* (2013.01); *B01F 35/2215* (2022.01); *B01F 35/71805* (2022.01);
(Continued)

(58) Field of Classification Search
CPC ............. B05C 11/1042; B05C 11/1036; B05C 11/1047; B05C 11/1015; B05C 11/1007;
(Continued)

(56) References Cited

U.S. PATENT DOCUMENTS 3,021,779 A * 2/1962 Sollich ..................... A23G 1/18
99/485
2011/0134717 A1 * 6/2011 Furuichi .................. C09D 7/80
366/139
(Continued)

FOREIGN PATENT DOCUMENTS

CN 208975700 U 6/2019
JP H01281133 A 11/1989
(Continued)

OTHER PUBLICATIONS

Englsih machine transaltion of KR20130122909 (Year: 2013).*
International Search Report for PCT/KR2023/016735 mailed Jan. 25, 2024. 3 pages.

*Primary Examiner* — Scott W Dodds
(74) *Attorney, Agent, or Firm* — Lerner David LLP

(57) ABSTRACT

An electrode slurry transfer system, including: a mixer storage tank for storing an electrode slurry discharged from a mixer; a first transfer tank for storing a high temperature slurry and connected to the mixer storage tank by a first transfer pipe branched in parallel; a second transfer tank for storing a low temperature slurry and connected to the mixer storage tank by a first transfer pipe branched in parallel; a coater supply tank configured to receive a high temperature slurry and a low temperature slurry from the first and second transfer tanks, respectively, and to supply an electrode slurry mixture thereof to a coater; a flow rate regulating portion configured to regulate a transfer flow rate of a high temperature slurry introduced into the coater supply tank from the first transfer tank, and a transfer flow rate of a low
(Continued)

temperature slurry introduced into the coater supply tank from the second transfer tank, respectively; and a control portion for controlling a temperature of the electrode slurry in the coater supply tank.

16 Claims, 3 Drawing Sheets

(51) Int. Cl.
*B01F 35/71* (2022.01)
*B05C 11/10* (2006.01)

(52) U.S. Cl.
CPC ...... *B05C 11/1002* (2013.01); *B05C 11/1036* (2013.01); *H01M 4/0404* (2013.01); *H01M 4/04* (2013.01)

(58) Field of Classification Search
CPC ............. B05C 11/1002; B05C 11/1026; B01F 25/432; B01F 25/4323; B01F 35/2215; H01M 4/0404
See application file for complete search history.

(56) References Cited

U.S. PATENT DOCUMENTS

| | | | | |
|---|---|---|---|---|
| 2014/0377451 | A1 | 12/2014 | Kim et al. | |
| 2016/0240399 | A1 * | 8/2016 | Kobayashi | H10P 72/0402 |
| 2022/0011793 | A1 * | 1/2022 | Kobayashi | G05D 23/1393 |
| 2022/0158158 | A1 * | 5/2022 | Kang | H01M 4/0402 |

FOREIGN PATENT DOCUMENTS

| | | | | |
|---|---|---|---|---|
| JP | H08033860 | A | 2/1996 | |
| JP | 2004047347 | A | 2/2004 | |
| JP | 3926189 | B2 | 6/2007 | |
| JP | 2022162912 | A | 10/2022 | |
| KR | 20130122909 | A * | 11/2013 | H01M 4/13 |
| KR | 101739369 | B1 | 5/2017 | |
| KR | 102073188 | B1 | 2/2020 | |
| KR | 20200048999 | A | 5/2020 | |
| KR | 20220051708 | A | 4/2022 | |
| KR | 20220051710 | A | 4/2022 | |
| KR | 20220087050 | A | 6/2022 | |
| WO | 2010018771 | A1 | 2/2010 | |

* cited by examiner

[FIG. 1]
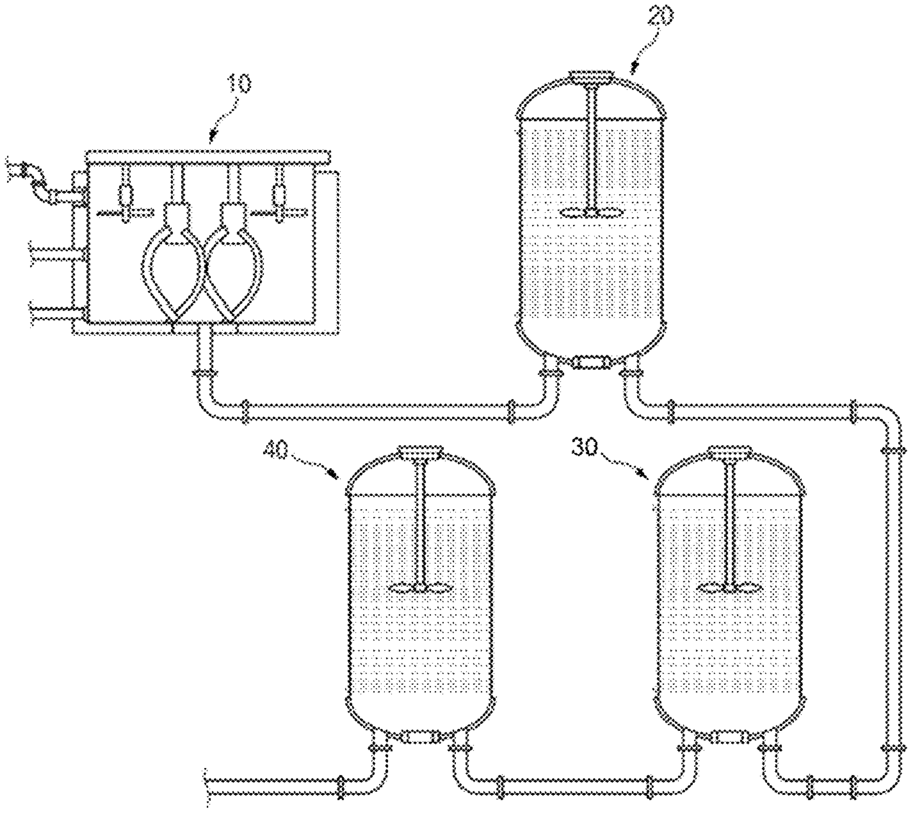
[FIG. 2]
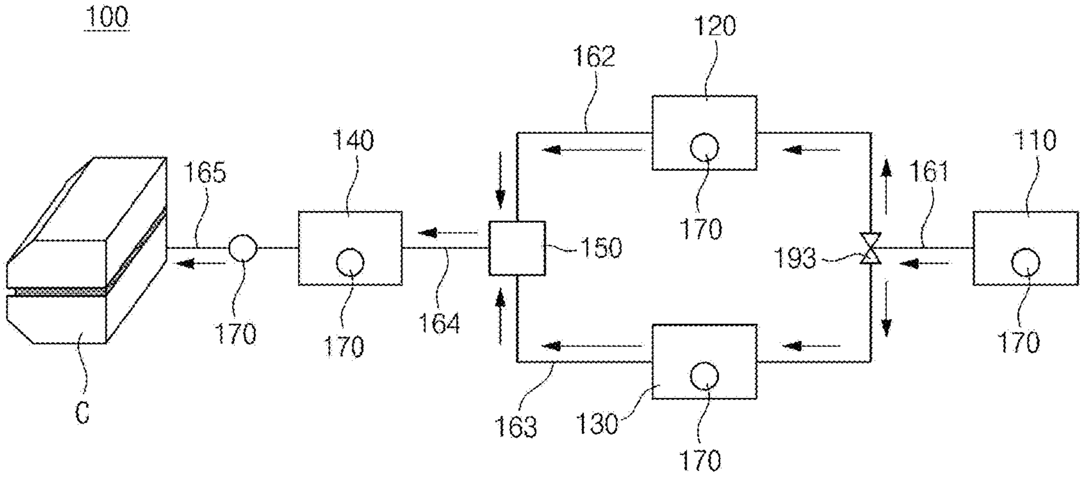

[FIG. 3]
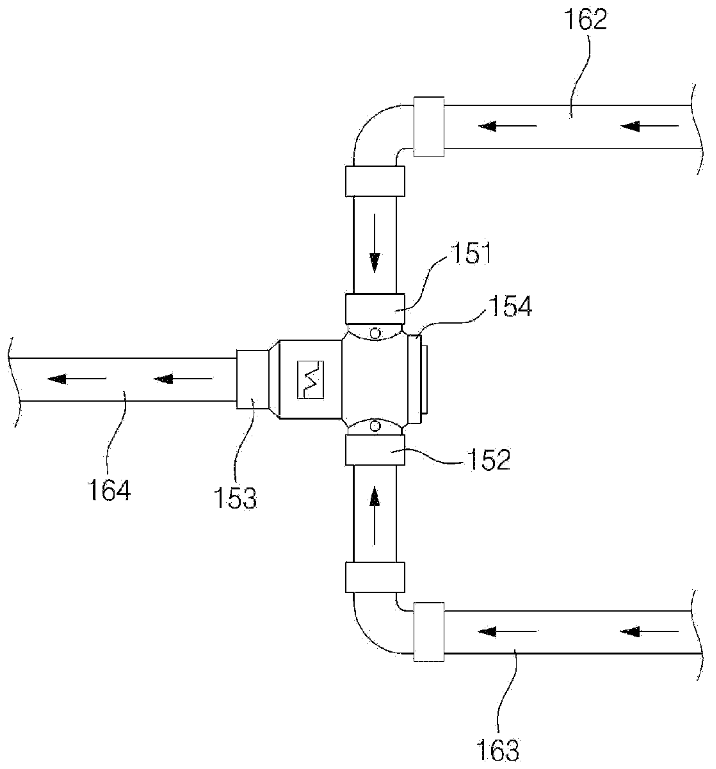

[FIG. 4]
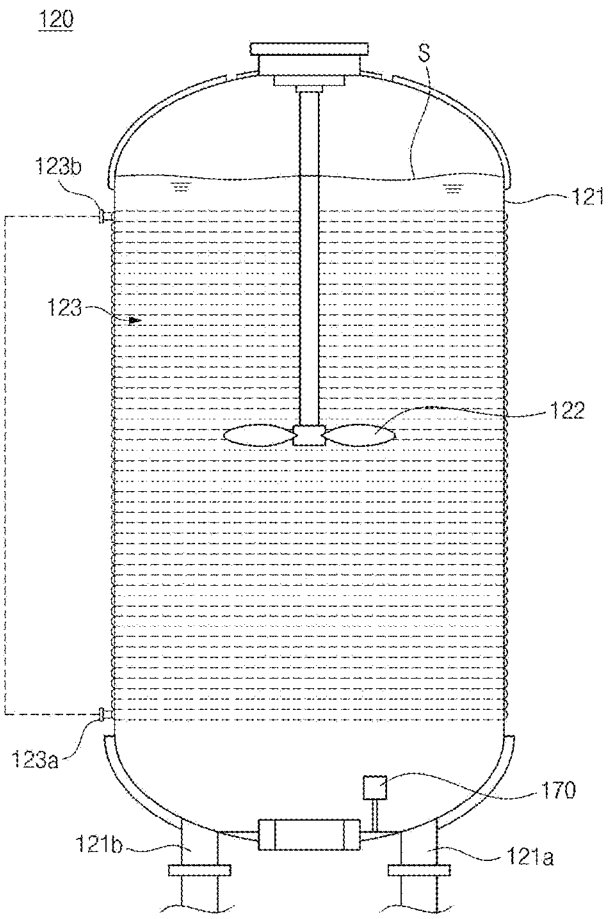
[FIG. 5]
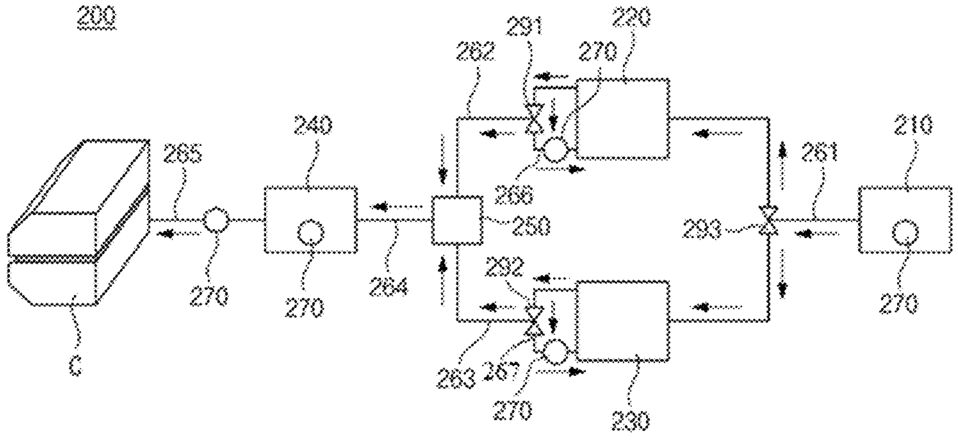

ELECTRODE SLURRY TRANSFER SYSTEM AND ELECTRODE SLURRY TEMPERATURE CONTROL METHOD USING SAME

CROSS-REFERENCE TO RELATED APPLICATION(S)

The present application is a national phase entry under 35 U.S.C. § 371 of International Application No. PCT/KR2023/016735, filed on Oct. 26, 2023, which claims priority from Korean Patent Application No. 10-2022-0139373, filed on Oct. 26, 2022, all of which are incorporated herein by reference.

TECHNICAL FIELD

The present disclosure relates to a transfer system for electrode slurry for transferring from a mixer to a coater that coats an electrode slurry to an electrode current collector and a method for controlling the temperature of electrode slurry.

More specifically, the present disclosure relates to an electrode slurry transfer system and a method for controlling the temperature of an electrode slurry that controls the temperature of the slurry by mixing a high temperature slurry and a low temperature slurry in a power receiving method, reduces the waiting time consumed for controlling the temperature of the slurry, and reduces the loss of the slurry used for controlling the temperature.

BACKGROUND TECHNOLOGY OF THE INVENTION

A secondary battery, which can be charged and discharged repeatedly, is used in various electronic devices. Meanwhile, as the types and shapes of electronic devices are diversifying, the types of secondary batteries installed in electronic devices are also diversifying. Recently, lithium-ion secondary batteries, which use lithium as a secondary battery, have been widely used.

To manufacture these secondary batteries, a negative electrode coated with a negative electrode active material, a positive electrode coated with a positive electrode active material, and a separator placed between the negative electrode and positive electrode are required. To manufacture these negative electrode and positive electrode active materials, a mixture of electrode active materials, conductive materials, and binders, called a slurry is often required.

Specifically, the manufacturing of positive electrode and negative electrode includes a mixing process to mix raw materials, as well as processes such as coating, drying, roll pressing, taping, and slitting. In the mixing process, where raw materials such as electrode active materials, conductive materials, and binders are mixed to form a uniform slurry, the temperature of the slurry gradually increases due to the heat of mixing, and the slurry is then transported through various tanks and coolant is used to control the temperature of the slurry to the desired temperature.

FIG. 1 illustrates a conventional electrode slurry transfer system. Referring to FIG. 1, in the prior art, the slurry formed in the mixer 10 is transferred to the mixer storage tank 20, the transfer tank 30, and finally to the coater supply tank 40, which supplies the slurry to the coating roll.

The temperature of the slurry affects coating quality, loading deviations, etc. during the coating process, so controlling it to the proper level is very important to ensure consistent electrode quality.

Since electrode coating is continuous, but slurry mixing is done in batches, and the temperature of the transferred slurry has a profile with periodic highs and lows. Here, in sections where the temperature changes rapidly, the time required to stabilize the slurry to the target temperature can be excessively long. In addition, if the coating process, which is a continuous process, is stopped for a while due to a changeover, disconnection, etc., and the process is resumed after adjusting the process conditions, and the temperature condition of the slurry may also be adjusted according to the adjustment of the process conditions. And depending on the readjustment of the temperature condition of the slurry, a longer waiting time for the slurry to reach the target temperature can reduce the production rate.

Therefore, there is a need to develop technologies that reduce the amount of current collector and slurry lost for temperature stabilization during coating and minimize the waiting time required to adjust the temperature of the slurry to the target value.

DESCRIPTION OF THE INVENTION

Technical Problem

The present disclosure seeks to provide an electrode slurry transfer system and an electrode slurry temperature control method that minimizes the time required to adjust the temperature of the electrode slurry to a target value, thereby minimizing the loss of the slurry and the current collector.

Technical Solution

An electrode slurry transfer system according to an exemplary embodiment of the present invention is an electrode slurry transfer system for transferring an electrode slurry from a mixer where an electrode slurry is mixed, to a coater for coating an electrode slurry, including: a mixer storage tank for storing an electrode slurry discharged from a mixer; a first transfer tank for storing a high temperature slurry and connected to the mixer storage tank by a first transfer pipe branched in parallel; a second transfer tank for storing a low temperature slurry and connected to the mixer storage tank by a first transfer pipe branched in parallel; a coater supply tank configured to receive a high temperature slurry and a low temperature slurry from the first and second transfer tanks, respectively, and to supply an electrode slurry mixture thereof to a coater; a flow rate regulating portion configured to regulate a transfer flow rate of a high temperature slurry introduced into the coater supply tank from the first transfer tank, and a transfer flow rate of a low temperature slurry introduced into the coater supply tank from the second transfer tank, respectively; and a control portion for controlling a temperature of the electrode slurry in the coater supply tank.

An electrode slurry transfer system according to an exemplary embodiment of the present invention may further include: a second transfer pipe connecting between the first transfer tank and the flow rate regulating portion to introduce a high temperature slurry into the flow rate regulating portion; a third transfer pipe connecting between the second transfer tank and the flow rate regulating portion to introduce a low temperature slurry into the flow rate regulating portion; a fourth transfer pipe connecting between the flow rate regulating portion and the coater supply tank to introduce high temperature and low temperature slurries into the coater supply tank; and a fifth transfer pipe connecting between the coater supply tank and the coater to introduce an electrode slurry into the coater.

In an electrode slurry transfer system according to an exemplary embodiment of the present invention, the flow rate regulating portion is provided with a first port connected to the second transfer pipe and a second port connected to the third transfer pipe, and may be configured to adjust an opening and closing rate of the first port and an opening and closing rate of the second port.

In an electrode slurry transfer system according to an exemplary embodiment of the present invention, the control portion may be configured to control a temperature of an electrode slurry in a coater supply tank by adjusting an opening and closing rate of the first and second ports, respectively.

An electrode slurry transfer system according to an exemplary embodiment of the present invention may further include a plurality of temperature sensors to measure the temperature of the electrode slurry, wherein the temperature sensor may be installed in a mixer storage tank, a first transfer tank, a second transfer tank, a coater supply tank, and a fifth transfer pipe, respectively.

In an electrode slurry transfer system according to an exemplary embodiment of the present invention, a first return pipe returning to the first transfer tank is branched from the second transfer pipe, and a first valve may be installed at the branching portion of the second transfer pipe and the first return pipe, and a second return pipe returning to the second transfer tank is branched from the third transfer pipe, and a second valve may be installed at the branching portion of the third transfer pipe and the second return pipe.

An electrode slurry transfer system according to an exemplary embodiment of the present invention may further include: a first circulation pump installed on the first return pipe to provide a driving force to circulate a high temperature slurry to a first transfer tank; and a second circulation pump installed on the second return pipe to provide a driving force to circulate a low temperature slurry to a second transfer tank.

An electrode slurry transfer system according to an exemplary embodiment of the present invention may further include a plurality of temperature sensors to measure the temperature of the electrode slurry, wherein the temperature sensor may be installed in a mixer storage tank, a first return pipe, a second return pipe, a coater supply tank, and a fifth transfer pipe, respectively.

In an electrode slurry transfer system according to an exemplary embodiment of the present invention, any one or more tanks among the mixer storage tank, the first transfer tank, and the second transfer tank may include: a chamber to receive a slurry; and a jacket formed on a wall of the chamber and circulating coolant to regulate the temperature of the slurry.

In an electrode slurry transfer system according to an exemplary embodiment of the present invention, the control portion may be configured to control the temperature of an electrode slurry in any one or more tanks among the mixer storage tank, the first transfer tank, and the second transfer tank, by regulating the temperature of the coolant in the jacket.

In an electrode slurry transfer system according to an exemplary embodiment of the present invention, the control portion may be configured to control the temperature of an electrode slurry by PID control (Proportional Integral Derivative Control).

In an electrode slurry transfer system according to an exemplary embodiment of the present invention, the control portion may control so that the temperature (Th) of a high temperature slurry in the first transfer tank satisfies condition 1 below, and the temperature (TI) of a low temperature slurry in the second transfer tank satisfies condition 2 below.

$$Ts \le Th \le Ts + 5\ {}^{\circ}\mathrm{C} \quad \text{[Condition 1]}$$

$$Ts - 5\ {}^{\circ}\mathrm{C} \le T1 \le Ts \quad \text{[Condition 2]}$$

(In Condition 1 and Condition 2 above, Ts is the target temperature of the electrode slurry in the coater supply tank)

In an electrode slurry transfer system according to an exemplary embodiment of the present invention, the control portion may control so that the temperature (Th) of a high temperature slurry in the first transfer tank satisfies condition 3 below, and the temperature (TI) of a low temperature slurry in the second transfer tank satisfies condition 4 below.

$$Ts + 1.5\ {}^{\circ}\mathrm{C} \le Th \le Ts + 3.5\ {}^{\circ}\mathrm{C} \quad \text{[Condition 3]}$$

$$Ts - 3.5\ {}^{\circ}\mathrm{C} \le Tl \le Ts - 1.5\ {}^{\circ}\mathrm{C} \quad \text{[Condition 4]}$$

(In Condition 3 and Condition 4 above, Ts is the target temperature of the electrode slurry in the coater supply tank)

In an electrode slurry transfer system according to an exemplary embodiment of the present invention, the control portion may control so that the temperature of an electrode slurry in the mixer storage tank is equal to the target temperature (Ts) of an electrode slurry in the coater supply tank.

In an electrode slurry transfer system according to an exemplary embodiment of the present invention, the control portion may control the temperature of the electrode slurry such that the sensing value of the temperature sensor installed in the fifth transfer pipe is the same as the sensing value of the temperature sensor installed in the coater supply tank.

A method of controlling the temperature of an electrode slurry according to an exemplary embodiment of the present invention uses the electrode slurry transfer system.

Advantageous Effects

The electrode slurry transfer system and the temperature control method of an electrode slurry according to the present disclosure, wherein a first transfer tank and a second transfer tank separately store high temperature slurry and low temperature slurry, respectively, and control the temperature of the electrode slurry in a coater supply tank by mixing them, but a flow rate regulating portion regulates the flow rate of the high temperature slurry and the flow rate of the low temperature slurry introduced into the coater supply tank, respectively, so that the slurry in the coater supply tank can quickly reach the target temperature.

The electrode slurry transfer system and the temperature control method of an electrode slurry according to the present disclosure, when regulating the temperature of the slurry, controls the temperature of the electrode slurry in the mixer storage tank to be the same as the target temperature of the electrode slurry in the coater supply tank, so that the time required to regulate the temperature of the electrode slurry in the first transfer tank and the second transfer tank can be reduced.

In addition, the electrode slurry transfer system and the temperature control method of the electrode slurry according to the present disclosure have the effect of increasing the production rate while reducing the loss of slurry and current collector consumed for temperature stabilization during coating, without requiring a major design change to the electrode slurry transfer system, since only one additional transfer tank and a flow rate regulating portion need to be installed in the conventional electrode slurry transfer system including a storage tank, a transfer tank, and a coater supply tank.

BRIEF DESCRIPTION OF THE DRAWINGS

FIG. 1 is a schematic diagram of a conventional electrode slurry transfer system.

FIG. 2 is a schematic diagram of an electrode slurry transfer system according to an exemplary embodiment of the present invention.

FIG. 3 is a schematic illustration of a flow rate regulating portion according to an exemplary embodiment of the present invention.

FIG. 4 is a schematic illustration of a first transfer tank according to an exemplary embodiment of the present invention.

FIG. 5 is a schematic diagram of an electrode slurry transfer system according to another exemplary embodiment of the present invention.

BEST MODE FOR CARRYING OUT THE INVENTION

Hereinafter, with reference to the accompanying drawings, various embodiments of the present invention are described in detail to facilitate practice by one having ordinary skill in the art to which the invention belongs. The present invention may be implemented in many different forms and is not limited to the embodiments described herein.

In order to clearly illustrate the present invention, parts not pertinent to the description have been omitted, and identical or similar components are designated by the same reference numerals throughout the specification.

Furthermore, the dimensions of each configuration shown in the drawings are arbitrary for purposes of illustration, and the present invention is not necessarily limited to those illustrated.

Also, throughout the specification, when a part is said to "include" a component, it means that it may further include other components, not that it excludes other components, unless specifically stated to the contrary.

FIG. 2 is a schematic diagram of an electrode slurry transfer system according to an exemplary embodiment of the present invention. In FIG. 2, arrows with a solid line indicate the flow of the slurry.

An electrode slurry transfer system 100, according to an exemplary embodiment of the present invention, includes a mixer storage tank 110, a first transfer tank 120, a second transfer tank 130, a coater supply tank 140, a flow rate regulating portion 150, and a control portion (not shown).

In a mixer not shown, electrode slurry may be prepared by mixing an electrode active material, a conductive material, and a binder or the like, and an electrode slurry prepared in the mixer may be transferred in the order of: a mixer storage tank 110, a first transfer tank 120 and a second transfer tank 130, a flow rate regulating portion 150, and a coater supply tank 140. An electrode slurry transferred to the coater supply tank 140 may be supplied to a coater C, coated on the current collector, and then subjected to processes such as drying, rolling, and the like.

The mixer storage tank 110 is the primary storage tank for an electrode slurry discharged from the mixer. The electrode slurry in the mixer storage tank 110 is transferred in parallel to the first transfer tank 120 and the second transfer tank 130.

In order to transfer the electrode slurry discharged from the mixer storage tank 110 to the first transfer tank 120 and the second transfer tank 130 in parallel, the area between the mixer storage tank 110 and the first transfer tank 120 and the area between the mixer storage tank 110 and the second transfer tank 130 are each connected by a first transfer pipe 161 branched in parallel. That is, the first transfer pipe 161 has a structure in which it is branched into two pipes as shown in FIG. 2, with one end of the first transfer pipe 161 extending into the interior of the mixer storage tank 110, and the other end of the branched transfer pipe extending into the interior of the first transfer tank 120 and the second transfer tank 130, respectively.

In one specific example, a valve 193 may be installed at a branch point along the path of the first transfer pipe, wherein the valve 193 may be a 3-way valve, specifically.

The first transfer tank 120 receives electrode slurry from the mixer storage tank 110 by the first transfer pipe 161, and stores the high temperature slurry. In one particular example, the temperature of the high temperature slurry stored in the first transfer tank 120 may be set to be higher than or equal to the target temperature Ts of the electrode slurry in the coater supply tank 140.

The second transfer tank 130 receives electrode slurry from the mixer storage tank 110 by the first transfer pipe 161, and stores the low temperature slurry. In one particular example, the temperature of the low temperature slurry stored in the second transfer tank 130 may be set to be lower than or equal to the target temperature Ts of the electrode slurry in the coater supply tank 140.

The coater supply tank 140 is a tank for storing electrode slurry for supplying to the coater C. It may receive high temperature slurry and low temperature slurry from the first transfer tank 120 and the second transfer tank 130, respectively, and store a mixture thereof.

The flow rate regulating portion 150 may be configured to regulate the temperature of the introduced electrode slurry in the coater supply tank 140 by regulating a flow rate of high temperature slurry into the coater supply tank 140 from the first transfer tank 120 and a flow rate of low temperature slurry into the coater supply tank 140 from the second transfer tank 130, respectively.

The first transfer tank 120 and the flow rate regulating portion 150 are connected by a second transfer pipe 162, and the high temperature slurry in the first transfer tank 120 flows into the flow rate regulating portion 150 by the second transfer pipe 162.

The second transfer tank 130 and the flow rate regulating portion 150 are connected by a third transfer pipe 163, and the low temperature slurry in the second transfer tank 130 flows into the flow rate regulating portion 150 by the third transfer pipe 163.

The flow rate regulating portion 150 and the coater supply tank 140 are connected by a fourth transfer pipe 164, which introduces high temperature slurry and low temperature slurry into the coater supply tank 140.

The coater supply tank 140 and the coater C are connected by a fifth transfer pipe 165, and the electrode slurry in the coater supply tank 140 flows into the coater C by the fifth transfer pipe 165.

A control portion (not shown), for controlling the temperature of the electrode slurry, may be configured to control the temperature of the electrode slurry in the coater supply tank by controlling each of the mixer storage tank, the first transfer tank, the second transfer tank, and the flow rate regulating portion.

The electrode slurry transfer system 100 according to the present disclosure divides the transfer tank, which supplies electrode slurry to a coater supply tank 140 in order to minimize the time required for the temperature of the electrode slurry in the coater supply tank 140 to reach a target temperature Ts, in two, wherein the first transfer tank 120 is configured to supply a high temperature slurry and the second transfer tank 130 is configured to supply a low temperature slurry, respectively, and the flow rate regulating portion 150 regulates the flow rate of the high temperature slurry and the flow rate of the low temperature slurry, respectively, so that the temperature of the electrode slurry in the coater supply tank 140 can be quickly controlled to reach a target temperature Ts. Here, the target temperature is an arbitrarily specified value of the temperature to be targeted for the slurry temperature control.

FIG. 3 is a schematic illustration of a flow rate regulating portion according to one embodiment of the present invention. Referring to FIG. 3, the flow rate regulating portion 150 may have a first port 151, a second port 152, and a third port 153 connected to a second transfer pipe 162, a third transfer pipe 163, and a fourth transfer pipe 164, respectively. And, these first to third ports 151-153 may configure a flow rate regulating portion housing 154 of the flow rate regulating portion.

Inside the flow rate regulating portion housing 154, a flow rate control valve (not shown) configured to open and close each of the first port 151 and the second port 152 may be installed, wherein one flow rate control valve may regulate the respective opening and closing rates of the first port 151 and the second port 152, or a flow rate control valve may be installed at each of the first port 151 and the second port 152 such that each flow rate control valve regulates the opening and closing rate of the first port 151 and the opening and closing rate of the second port 152.

In the flow rate regulating portion 150, a respective opening and closing rate of the first port 151 and the second port 152 may be regulated by the control portion, thereby controlling the temperature of the electrode slurry in the coater supply tank 140. Specifically, if the temperature of the electrode slurry in the coater supply tank 140 needs to be increased, the first port 151 can be opened 100% to 75% and the second port 152 can be opened 0% to 25% to increase the flow rate of the high temperature slurry being introduced through the first port. Conversely, if the temperature of the electrode slurry in the coater supply tank 140 needs to be lowered, the first port 151 can be opened 0% to 25% and the second port 152 can be opened 100% to 75% to increase the flow rate of the low temperature slurry being introduced through the second port.

The flow rate regulating portion 150 may further include an actuator (not shown) that operates the flow rate control valve on one side of the flow rate control valve (not shown), and a flow rate control valve controller (not shown) that controls the operation of the actuator by receiving input from the control portion (not shown) of a respective opening and closing rate of the first port and the second port.

The electrode slurry transfer system of the present disclosure further includes a plurality of temperature sensors for measuring the temperature of the electrode slurry in order to control the temperature of the electrode slurry, wherein the temperature sensors may be installed in the mixer storage tank 110, the first transfer tank 120, the second transfer tank 130, the coater supply tank 140, and the fifth transfer pipe 165, respectively.

The temperature sensor may be configured to measure the temperature of the electrode slurry in real time and transmit the measured temperature data to the control portion in real time. Accordingly, the control portion may control the temperature of the electrode slurry supplied to the coater C to a target temperature in real time based on the received temperature data.

In one specific example, the control portion may control the temperature of the electrode slurry by means of PID control (Proportional Integral Derivative Control). PID control is a proportional control method that utilizes the difference between a target temperature and the current temperature, such that the temperature of the electrode slurry supplied to the coater C can be controlled to a target temperature.

FIG. 4 is a schematic diagram of a first transfer tank according to an exemplary embodiment of the present invention. Referring to FIG. 4, the first transfer tank may include a chamber 121 receiving the slurry S, an impeller 122 disposed in the interior of the chamber 121 to mix the slurry S, a temperature sensor 170 to measure the temperature of the slurry S, and a jacket 123 formed on a wall of the chamber 121 to regulate the temperature of the slurry S.

In the chamber 121, an inlet pipe 121*a* and an outlet pipe 121*b* are formed, so that the slurry S can be introduced into and discharged from the chamber 121. An impeller 122 may be installed inside the chamber 121, and may be driven by an external driving force of the chamber 121 to mix the electrode slurry S inside the chamber. For example, the impeller 122 may be driven by a motor provided in a central upper portion of the chamber 121.

The jacket 123 may be formed on an outer surface of the chamber 121 and configured to circulate coolant to regulate the internal temperature of the chamber 121 and the temperature of the incoming slurry S. For example, a jacket 123 spirally connected along the outer surface of the chamber 121 may form a passage between the chamber 121 and the jacket 123, and coolant may be circulated along the passage. In addition, a coolant inlet pipe 123*a* and a coolant outlet pipe 123*b* are connected to the jacket 123, so that coolant can be continuously introduced and discharged. Meanwhile, there is no particular restriction on the position of the jacket 123, so a configuration in which the jacket 123 is formed on the inner surface of the chamber 121 is also possible.

The temperature sensor 170 is installed inside the chamber 121, and can measure the temperature inside the chamber 121 and the temperature of the incoming slurry S in real time. The temperature data measured by the temperature sensor 170 is transmitted to the control portion, and the control portion can regulate the temperature of the coolant flowing inside the jacket based on the temperature data to control the temperature of the electrode slurry stored in the first transfer tank 120 to a high temperature.

The above configuration for the first transfer tank 120 can be adopted for the second transfer tank 130 and the mixer storage tank 110. That is, like the first transfer tank, the second transfer tank may include a configuration of a chamber, an impeller, a temperature sensor, and a jacket to control the temperature of the electrode slurry in the second transfer tank 130 to a low temperature, and the mixer storage tank 110 may include a configuration of a chamber, an impeller, a temperature sensor, and a jacket to control the temperature of the electrode slurry stored in the mixer storage tank 110.

In an electrode slurry transfer system of this configuration, the control portion may control the temperature of the electrode slurry inside the mixer storage tank 110, the first transfer tank 120, and the second transfer tank 130 to a suitable temperature range by regulating the temperature of the coolant.

In the electrode slurry transfer system according to an exemplary embodiment of the present invention, the control portion may control so that the temperature (Th) of a high temperature slurry in the first transfer tank 120 satisfies condition 1 below, and the temperature (TI) of a low temperature slurry in the second transfer tank 130 satisfies condition 2 below.

$$Ts \leq Th \leq Ts + 5\ °C \quad \text{[Condition 1]}$$

$$Ts - 5\ °C \leq T1 \leq Ts \quad \text{[Condition 2]}$$

(In Condition 1 and Condition 2 above, Ts is the target temperature of the electrode slurry in the coater supply tank)

In the electrode slurry transfer system according to an exemplary embodiment of the present invention, the control portion may control so that the temperature (Th) of a high temperature slurry in the first transfer tank satisfies condition 3 below, and the temperature (TI) of a low temperature slurry in the second transfer tank satisfies condition 4 below.

$$Ts + 1.5\ °C \leq Th \leq Ts + 3.5\ °C \quad \text{[Condition 3]}$$

$$Ts - 3.5\ °C \leq Tl \leq Ts - 1.5\ °C \quad \text{[Condition 4]}$$

(In Condition 3 and Condition 4 above, Ts is the target temperature of the electrode slurry in the coater supply tank)

By controlling the temperature of the high temperature slurry in the first transfer tank 120 and the temperature of the low temperature slurry in the second transfer tank 130 to satisfy each of the above conditions 1 and 2, and more specifically, conditions 3 and 4, a temperature change due to mixing of the high temperature slurry and the low temperature slurry introduced into the coater supply tank 140 can be achieved in a short time.

In the electrode slurry transfer system according to an exemplary embodiment of the present invention, the control portion may control a temperature of the electrode slurry in the mixer storage tank 110 to be equal to a target temperature (Ts) of the electrode slurry in the coater supply tank 140.

The greater the difference between the temperature of the electrode slurry in the mixer storage tank 110 and the temperature of the electrode slurry in the coater supply tank 140, the longer the time required to heat and cool the slurry in the first transfer tank and the second transfer tank, respectively. Thus, by controlling the temperature of the electrode slurry in the mixer storage tank 110 to be equal to the target temperature Ts of the electrode slurry in the coater supply tank 140, the temperature change of the slurry supplied in the first transfer tank 120 and the second transfer tank 130, respectively, may be minimized, thereby reducing the stabilization time of the slurry temperature.

In the electrode slurry transfer system according to an exemplary embodiment of the present invention, the control portion can control the temperature of the electrode slurry such that the sensing value of the temperature sensor 170 installed in the fifth transfer pipe 165 is the same as the sensing value of the temperature sensor 170 installed in the coater supply tank 140. Accordingly, the electrode slurry transfer system causes the electrode slurry in the coater supply tank 140 having a changed temperature to be supplied to the coater C according to the respective flow rate control of the high temperature slurry and the low temperature slurry entering the coater supply tank 140.

FIG. 5 is a schematic diagram of an electrode slurry transfer system according to another exemplary embodiment of the present invention. Referring to FIG. 5, in the electrode slurry transfer system 200, a first return pipe 266 returning to the first transfer tank 220 from the second transfer pipe 262 is branched, with a first valve 291 installed at the branching portion of the second transfer pipe 262 and the first return pipe 266, and a second return pipe 267 returning to the second transfer tank 230 from the third transfer pipe 263 is branched, with a second valve 292 installed at the branching portion of the third transfer pipe 263 and the second return pipe 267. Each of the first valve 291 and the second valve 292 may be a three-way valve.

The electrode slurry discharged from the first transfer tank 220 is pumped by a pump (not shown) and transferred to the coater supply tank 240 via the second transfer pipe 262, but if more than a set amount of slurry is supplied in the coater supply tank 240, the slurry supply to the coater supply tank 240 can be blocked by the first valve 291, and the electrode slurry may be returned to the first transfer tank 220 via the first return pipe 266.

Similarly, the supply of slurry to the coater supply tank 240 may be blocked by the second valve 292, thereby the electrode slurry discharged from the second transfer tank 230 may be returned to the second transfer tank 230 via the second return pipe 267.

In addition, the electrode slurry transfer system 200 may further include: a first circulation pump (not shown) installed on the first return pipe 266 to provide a driving force to circulate high temperature slurry to the first transfer tank 220; and a second circulation pump (not shown) installed on the second return pipe 267 to provide a driving force to circulate low temperature slurry to the second transfer tank 230.

In addition, electrode slurry transfer system 200 may further include a plurality of temperature sensors 270 for measuring the temperature of the electrode slurry, wherein the temperature sensors 270 may be installed in the mixer storage tank 210, the first return pipe 266, the second return pipe 267, the coater supply tank 240, and the fifth transfer pipe 265, respectively.

The temperature sensor 270 may be configured to measure the temperature of the electrode slurry in real time and transmit the measurement data to the control portion, and the control portion may, based on the measurement data received from the temperature sensor, adjust the operation of the various components comprising the electrode transfer system to control the temperature of the electrode slurry so that the temperature of the electrode slurry reaches a target temperature.

Hereinafter, a temperature control method of an electrode slurry according to an exemplary embodiment of the present invention will be described. The temperature control method of the electrode slurry according to the present disclosure controls the temperature of the electrode slurry by utilizing the electrode slurry transfer system described above.

Referring to FIGS. 1 to 4, a temperature control method of an electrode slurry according to an exemplary embodiment of the present invention includes a slurry supply process S1 in which an electrode slurry prepared by a mixer not shown is supplied to a mixer storage tank 110, a first transfer tank 120 and a second transfer tank 130, and a coater supply tank 140; an electrode slurry temperature measuring process S2 of measuring the temperature of the electrode slurry, via temperature sensors installed in the mixer storage tank, the first transfer tank, the second transfer tank, the coater supply tank and the fifth transfer pipe, respectively; an electrode slurry temperature regulating process S3 of regulating the temperature of the electrode slurry in each of the mixer storage tank 110, the first transfer tank 120, and the second transfer tank 130 by an indirect method with a coolant; a process S4 of regulating a transfer flow rate of the high temperature slurry from the first transfer tank 120 to the coater supply tank 140 and a transfer flow rate of the low temperature slurry from the second transfer tank 130 to the coater supply tank 140, respectively, by a flow rate regulating portion 150; and a process S5 of controlling a temperature of the coolant, a transfer flow rate of the high temperature slurry, and a transfer flow rate of the low temperature slurry by the flow rate regulating portion in real time.

In the slurry supply process S1, the electrode slurry discharged from the mixer storage tank 110 may be introduced into the first transfer tank 120 and the second transfer tank 130 by the first transfer pipe 161 having a parallel branched structure. Accordingly, the first transfer tank 120 supplies high temperature slurry to the coater supply tank 140 via the second transfer pipe 162 and the flow rate regulating portion 150, and the second transfer tank 130 supplies low temperature slurry to the coater supply tank 140 via the third transfer pipe 163 and the flow rate regulating portion 150.

The process of measuring the temperature of the electrode slurry S2 is a process of determining the current temperature of the electrode slurry, and the electrode slurry temperature control method according to the present disclosure measures the temperature of the electrode slurry in real time through the temperature sensor and transmits the temperature data to the control portion.

In the process S3 of adjusting the temperature of the electrode slurry in each of the mixer storage tank 110, the first transfer tank 120, and the second transfer tank 130, the indirect method of coolant may be a heat exchange method in which indirect heating or indirect cooling is achieved by circulating the coolant inside the jacket, as previously described.

The process S4 of regulating a transfer flow rate of the high temperature slurry entering the coater supply tank 140 from the first transfer tank 120, and a respective transfer flow rate of the low temperature slurry entering the coater supply tank 140 from the second transfer tank 130 is a process of regulating a transfer flow rate of the high temperature slurry into the coater supply tank 140, and a transfer flow rate of the low temperature slurry into the coater supply tank 140, in order to cause the temperature of the electrode slurry in the coater supply tank 140 to quickly reach a target temperature.

At this time, the flow rate regulating portion 150 can regulate the transfer flow rate of the high temperature slurry and the transfer flow rate of the low temperature slurry entering the coater supply tank 140 by adjusting the respective opening and closing rates of the first port 151 connected with the second transfer pipe 162 and the second port 152 connected with the third transfer pipe 163.

Based on the difference between the current temperature of the electrode slurry measured in real time in the temperature measurement process S2 by the temperature sensor 170 and the target temperature, the process S5 of controlling the temperature of the coolant, the transfer flow rate of the high temperature slurry, and the transfer flow rate of the low temperature slurry by the flow rate regulating portion in real time may include controlling the temperature of the respective electrode slurry in the mixer storage tank 110, the first transfer tank 120, and the second transfer tank 130 by adjusting the temperature of the coolant circulating through the respective jackets installed in the mixer storage tank 110, the first transfer tank 120, and the second transfer tank 130. It may also include controlling the operation of a flow rate regulating portion to control the temperature of the electrode slurry in the coater supply tank 140 to meet a target temperature.

As described above, the electrode slurry transfer system and the temperature control method of the electrode slurry according to the present disclosure, wherein the first transfer tank and the second transfer tank separately store high temperature slurry and low temperature slurry, respectively, and the flow rate regulating portion regulates the flow rate of the high temperature slurry and the flow rate of the low temperature slurry entering the coater supply tank, so that the temperature of the slurry in the coater supply tank can be controlled to quickly reach a target temperature.

In addition, when adjusting the temperature of the slurry, the time required to reach the target value can be reduced, increasing production rates and reducing the loss amount of slurry and current collector required to stabilize the temperature during coating.

The present invention has been described in more detail above with reference to the drawings and embodiments. However, it is to be understood that the configurations shown in the drawings or embodiments described herein are only one embodiment of the invention and do not represent all of the technical ideas of the present invention, and that there may be various equivalents and modifications that may replace them at the time of filing the present disclosure.

REFERENCE NUMERALS

100, 200: ELECTRODE SLURRY TRANSFER SYSTEM
110, 210: STORAGE TANK
120, 220: FIRST TRANSFER TANK
130, 230: SECOND TRANSFER TANK
140, 240: COATER SUPPLY TANK
150, 250: FLOW RATE REGULATING PORTION
151-153: FIRST PORT TO THIRD PORT
161~165, 261~265: FIRST TRANSFER PIPE TO FIFTH TRANSFER PIPE
266~267: FIRST RETURN PIPE TO SECOND RETURN PIPE
170, 270: TEMPERATURE SENSOR
291 TO 293: FIRST VALVE TO THIRD VALVE
C: COATER

The invention claimed is:

1. An electrode slurry transfer system for transferring an electrode slurry from a mixer where the electrode slurry is mixed, to a coater for coating the electrode slurry, comprising:

a mixer storage tank configured to store the electrode slurry discharged from the mixer;

a first transfer tank configured to store a high temperature slurry and connected to the mixer storage tank by a first transfer pipe branched in parallel;

a second transfer tank configured to store a low temperature slurry and connected to the mixer storage tank by the first transfer pipe branched in parallel;

a coater supply tank configured to receive the high temperature slurry and the low temperature slurry from the first and second transfer tanks, respectively, and to supply an electrode slurry mixture thereof to the coater;

a flow rate regulating portion configured to regulate a transfer flow rate of the high temperature slurry introduced into the coater supply tank from the first transfer tank, and a transfer flow rate of the low temperature slurry introduced into the coater supply tank from the second transfer tank, respectively; and a control portion for controlling a temperature of the electrode slurry in the coater supply tank.

2. The electrode slurry transfer system of claim 1, further comprising:

a second transfer pipe connecting between the first transfer tank and the flow rate regulating portion to introduce the high temperature slurry into the flow rate regulating portion;

a third transfer pipe connecting between the second transfer tank and the flow rate regulating portion to introduce the low temperature slurry into the flow rate regulating portion;

a fourth transfer pipe connecting between the flow rate regulating portion and the coater supply tank to introduce high temperature and low temperature slurries into the coater supply tank; and a fifth transfer pipe connecting between the coater supply tank and the coater to introduce the electrode slurry into the coater.

3. The electrode slurry transfer system of claim 2, wherein:

the flow rate regulating portion is provided with a first port connected to the second transfer pipe and a second port connected to the third transfer pipe, and the flow rate regulating portion is configured to adjust an opening percentage of the first port and an opening percentage of the second port.

4. The electrode slurry transfer system of claim 3, wherein: the control portion is configured to controls the temperature of the electrode slurry in the coater supply tank by adjusting the opening percentage the first and second ports, respectively.

5. The electrode slurry transfer system of claim 2, further comprising:

a plurality of temperature sensors configured to measure the temperature of the electrode slurry, wherein at least one of the plurality of temperature sensors is installed in each of the mixer storage tank, the first transfer tank, the second transfer tank, the coater supply tank, and the fifth transfer pipe, respectively.

6. The electrode slurry transfer system of claim 2, wherein:

a first return pipe returning to the first transfer tank is branched from the second transfer pipe, and a first valve is installed at a branching portion of the second transfer pipe and the first return pipe, and a second return pipe returning to the second transfer tank is branched from the third transfer pipe, and a second valve is installed at a branching portion of the third transfer pipe and the second return pipe.

7. The electrode slurry transfer system of claim 6, further comprising:

a first circulation pump installed on the first return pipe configured to provide a driving force to circulate the high temperature slurry to the first transfer tank; and a second circulation pump installed on the second return pipe configured to provide a driving force to circulate the low temperature slurry to the second transfer tank.

8. The electrode slurry transfer system of claim 6, further comprising:

a plurality of temperature sensors configured to measure the temperature of the electrode slurry, wherein at least one of the plurality of temperature sensors is installed in each of the mixer storage tank, the first return pipe, the second return pipe, the coater supply tank, and the fifth transfer pipe, respectively.

9. The electrode slurry transfer system of claim 1, wherein:

one or more of the mixer storage tank, the first transfer tank, and the second transfer tank comprises:

a chamber configured to receive a slurry; and a jacket formed on a wall of the chamber and configured to circulate coolant to regulate the temperature of the slurry.

10. The electrode slurry transfer system of claim 9, wherein: the control portion is configured to control the temperature of the electrode slurry in the one or more of the mixer storage tank, the first transfer tank, and the second transfer tank, by regulating at a temperature of the coolant in the jacket.

11. The electrode slurry transfer system of claim 1, wherein:

the control portion is configured to control the temperature of the electrode slurry by Proportional Integral Derivative (PID) control.

12. The electrode slurry transfer system of claim 1, wherein:

the control portion is configured to maintain a temperature (Th) of the high temperature slurry in the first transfer tank such that condition 1 below is satisfied, and the control portion is configured to maintain a temperature (TI) of the low temperature slurry in the second transfer tank such that condition 2 below is satisfied:

$$Ts \leq Th \leq Ts + 5\ ^{\circ}\mathrm{C} \quad \text{[Condition 1]}$$

$$Ts - 5\ ^{\circ}\mathrm{C} \leq T1 \leq Ts \quad \text{[Condition 2]}$$

wherein, in the Condition 1 and the Condition 2 above, Ts is a target temperature of the electrode slurry in the coater supply tank.

13. The electrode slurry transfer system of claim 1, wherein:

the control portion is configured to:

control a temperature (Th) of the high temperature slurry in the first transfer tank such that condition 3 below is satisfied, and control a temperature (TI) of the low temperature slurry in the second transfer tank such that condition 4 below is satisfied:

$$Ts + 1.5\ ^{\circ}\mathrm{C} \leq Th \leq Ts + 3.5\ ^{\circ}\mathrm{C} \quad \text{[Condition 3]}$$

$$Ts - 3.5\ ^{\circ}\mathrm{C} \leq Tl \leq Ts - 1.5\ ^{\circ}\mathrm{C} \quad \text{[Condition 4]}$$

wherein, in the Condition 3 and the Condition 4 above, Ts is a target temperature of the electrode slurry in the coater supply tank.

14. The electrode slurry transfer system of claim 1, wherein:

the control portion is configured to maintain the temperature of the electrode slurry in the mixer storage tank equal to a target temperature Ts of the electrode slurry in the coater supply tank.

15. The electrode slurry transfer system of claim 2, wherein:

the control portion is configured to controls the temperature of the electrode slurry such that a sensing value of a temperature sensor installed in the fifth transfer pipe is the same as a sensing value of a temperature sensor installed in the coater supply tank.

16. A method of using the electrode slurry transfer system according to claim 1, comprising:

controlling the temperature of the electrode slurry.

* * * * *